INVENTORS
ROBERT W. FOREMAN AND
FRANKLIN VEATCH

INVENTORS
ROBERT W. FOREMAN and
FRANKLIN VEATCH 3,119,760
ELECTROLYTIC CELL FOR THE OXIDATION AND
REDUCTION OF ORGANIC COMPOUNDS
Robert W. Foreman, Chagrin Falls, and Franklin Veatch,
Lyndhurst, Ohio, assignors to The Standard Oil Company, Cleveland, Ohio, a corporation of Ohio
Filed Dec. 30, 1959, Ser. No. 862,965
1 Claim. (Cl. 204—269)

This invention relates to electrolytic cells, and more particularly to electrolytic cells especially adapted for the oxidation and reduction of chemical compounds, preferably organic compounds.

Electrochemical oxidation and reduction reactions in various electrolyte media have heretofore been carried out generally in divided cells including a diaphragm for the purpose of reducing diffusion and interaction of reaction products. Moreover, little regard has been given to the nature of the flow of fluid through the cell.

The present invention pertains to improved electrolytic cells in which no gas is given off and through which may be passed in continuous manner electrolyte containing material capable of undergoing oxidation and/or reduction to produce useful compounds. The energy for the chemical reaction is provided by the current that is supplied to the cell. The present invention also contemplates electrolytic cells characterized by the absence of a diaphragm and having a laminated arrangement of planar electrodes. The cells of this invention are still further improved by providing in cell units, internal structure productive of a sheet-like flow of fluid across the electrode faces. By continuously flowing through such an apparatus a dilute aqueous solution of an aliphatic unsaturated aldehyde and a hydrogen halide, for example, while imposing a uni-directional electric current thereon, there may be produced in high yields the corresponding halohydrins. Such apparatus has particular utility in the manufacture of halohydrin directly from acrolein by passage of an electrical current through a dilute aqueous solution of acrolein.

In the annexed drawings.

In brief, the apparatus of the present invention is an electrolytic cell having a plurality of planar electrodes disposed in spaced laminar relation to each other, i.e., a sandwich-type arrangement of the electrodes.

The adjacent electrode surfaces are maintained in spaced apart relation by flat sheets of electrically non-conducting material. Each insulating sheet is provided with a cut-out portion which in conjunction with the adjacent electrode surfaces forms an electrochemical reaction chamber. The marginal boundaries of the cut-out portions enclose the chamber between the electrodes, confine and direct the electrolyte therein and maintain the electrodes out of short circuiting contact. The adjacent electrodes may then be coupled to opposite poles of a source of uni-directional electrical energy of suitable potential to form an undivided electrochemical reaction cell unit. Each electrode is provided with a passageway therethrough successively connecting a plurality of such reaction chambers together in series relation to form a multi-unit electrolytic cell. Only one end of each electrode is provided with fluid passage means, and in adjacently disposed electrodes, these are located at opposite marginal extremities of the cell unit. In a preferred embodiment, these passages are so related geometrically to the adjacent marginal configuration of the insulating member as to aid in providing a uniform distribution and flow of electrolyte throughout the chamber, herein referred to as sheet-like flow of a relatively thin layer of electrolyte fluid.

Figure 1:
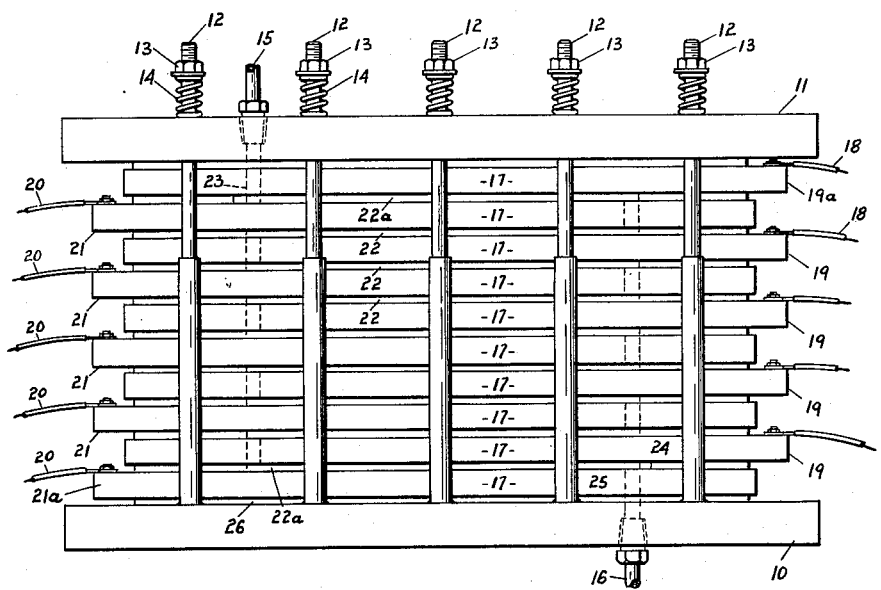
FIG. 1 is a front elevational view of an electrolytic cell in accordance with the present invention.

Referring more particularly now to FIG. 1, there is here shown in front elevational view one embodiment of a multiple unit electrolytic cell of the surmounting laminar type in accordance with the present invention. In the illustrated embodiment, there is provided a pair of end plates 10 and 11, respectively, having any suitable clamping means, such as, the threaded studs 12 peripherally disposed along the marginal edges of the end plates 10 and 11, respectively, and being threadedly retained in end plate 10 and piercing end plate 11 through aligned bores. Any suitable retaining means such as nuts 13 and springs 14 adapted to adjustably apply pressure between end plates 10 and 11 may be employed. Passages or conduits 15 and 16 through end plates 11 and 10, respectively, provide the cell for inlet and outlet of the fluid.

Sandwiched between the end plates 10 and 11 are a plurality of electrodes 17, each of which is connected to any conventional source of uni-directional electrical energy, not forming a part of this invention and therefore not shown. These electrodes 17 may have any suitable geometric configuration and we prefer to use rectangular electrodes. In FIG. 1, alternate electrodes 17 are shown connected to suitable wires or cables 18 which lead to a positive terminal of the aforesaid source of uni-directional electrical energy. The electrodes 17 so connected become, therefore, anodes 19.

Disposed alternately with and spaced out of electrical contact with the anodes 19 are electrodes 17 which are connected through wires or cables 20 to a negative terminal of the source of uni-directional electrical energy. This constitutes electrodes 17 so connected as cathodes 21.

Figure 2:
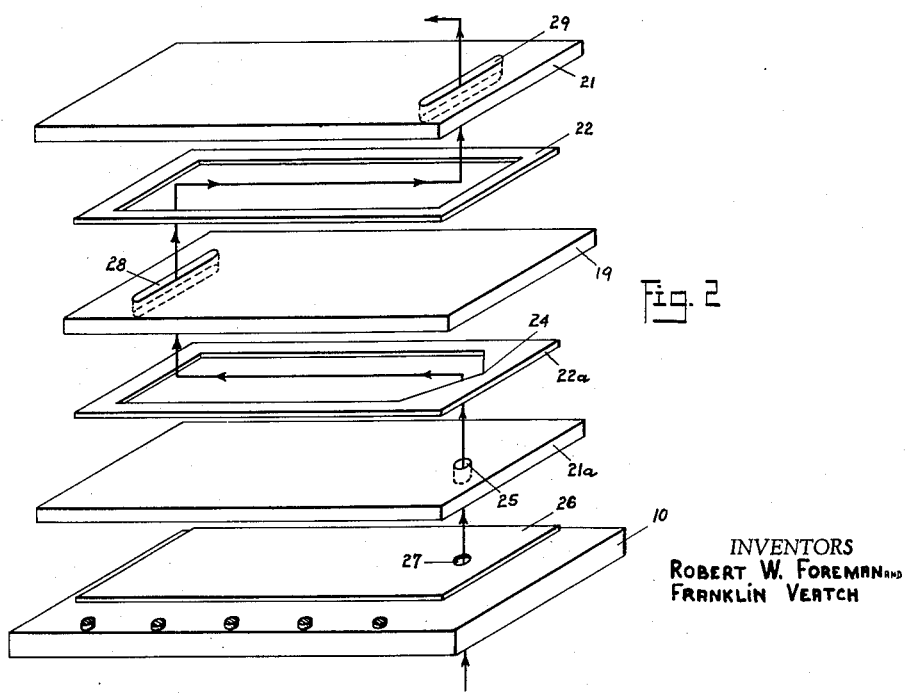
FIG. 2 illustrates in exploded relation a series of electrodes and insulators, and shows the flow pattern of fluid through the cell.

Disposed intermediate adjacent electrodes 17 are insulating members 22 which may be of an electrically non-conductive material, and preferably of elastic nature so as to be capable of undergoing compression and thereby form a liquid seal. Several forms of insulator 22 are shown in FIG. 2. In general the insulator material 22 forms a marginal closure for the space between the anodes 19 and the cathodes 21, and in a preferred case defines a rectangular reaction chamber. This in combination with a rectangular electrode 17 provides for maximum utilization of available electrode area. Insulators 22a adjacent a terminal cathode 21a or anode 19a have, in a preferred embodiment, a somewhat different marginal shape designed to aid the fluid flow into and out of the cell unit respectively, by minimizing areas of stagnation. Accordingly the walls of insulator 22a diverge from apex 24. In the assembled cell, apex 24 is disposed adjacent an inlet provided by an aperture 25 in the cathode 21a and correspondingly, with insulator 22a adjacent anode 19a, apex 24 is disposed adjacent an outlet formed by an aperture 23 in the anode 19a, shown in dotted lines in FIG. 1. The cathode 21a is insulated from the end plate 11 by means of insulator 26 which has an inlet 27 therein. The inlet 27 overlies and communicates with the passage 16 through the end plate 10. Anode 19a is insulated from end plate 11 by insulator member 22a which, although not itself shown in FIG. 2, conveniently has the same configuration as insulator member 26, although oppositely disposed.

Continuous flow of electrolyte through the composite cell may be induced by gravity or by any conventional fluid pump not forming a part of this invention and hence not shown. In FIG. 2, the flow of fluid through the cell, considering the passage 16 as the inlet, is upward through the plate 10 and the insulator 26, and through the bore 25 in the cathode 21a. The fluid is then conducted to the upper face of the cathode 21a and under the directing influence of the diverging walls from apex 24 flows across the face as a relatively thin layer of electrolyte between the opposing faces of the cathode 21a and the anode 19 and confined therein by the inner walls of the insulator members 22. There is provided through the remote end of the anode 19 in maximum spaced relation an opening 28 preferably in the form of an elongated slot as shown, permitting the fluid to emerge therethrough and flow within the confined space marginally bounded by the insulator member 22 disposed between the upper face of the anode 19 and the lower face of the next adjacent cathode 21 as a sheet of electrolyte fluid. An elongated slot 29 is provided in the cathode 21 at a point remote from the slot 28 to permit the fluid to flow through the cathode 21 to the upper face of said cathode 21. Flow is continued serially through each cell unit, in opposite directions in adjacent cell units until the fluid emerges from the outlet 15 in end plate 11. To this type of flow we have ascribed the term "series flow."

Elongated slots 28 and 29 coact with the geometric configuration of the inner marginal walls of insulator members 22 to provide a fluid flow pattern effective to sweep the entire surfaces of the electrodes as the electrolyte flows therethrough. Desirably slots 28 and 29 have a length substantially co-extensive with the width of the reaction chamber, i.e. the width of the opening in the insulator members 22, and a slot width of about the inter-electrode spacing or the thickness of members 22. The diverging walls in members 22a serve to transform the fluid flow pattern from circular cross-section to a thin elongated sheet. Conversely at the outlet 23 in anode 19a the converging walls of insulator 22a to apex 24 therein serve to convert the sheet-like flow to circular cross-section flow for discharge from the cell.

Figure 3:
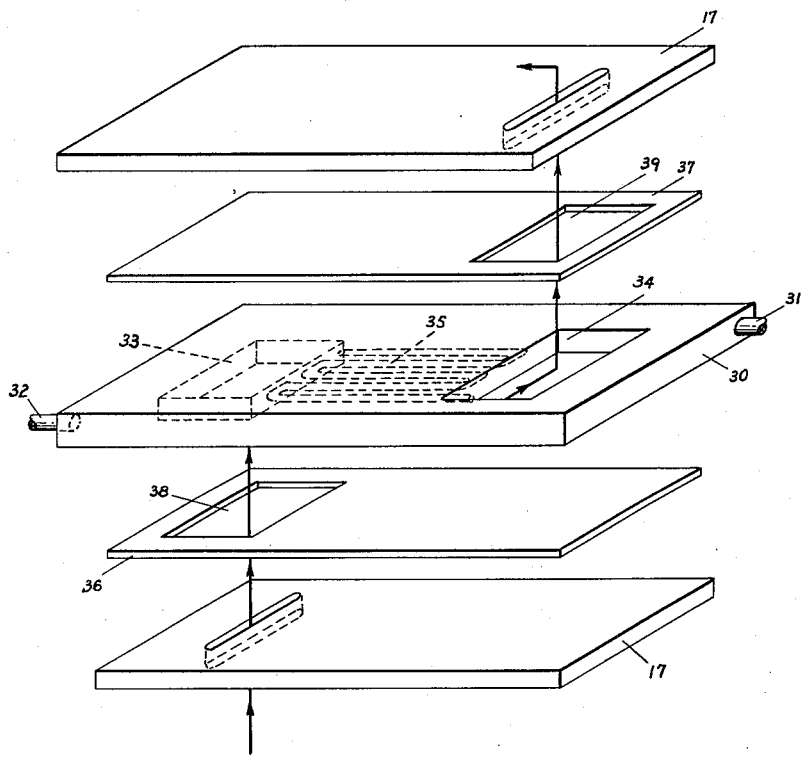
FIG. 3 is also an exploded illustration of electrodes and non-conductors showing heat exchanger means provided in the cell.

In FIG. 3 there has been shown in exploded diagrammatic form a portion of an apparatus of the type shown in FIG. 1 having interposed between adjacent cell units a heat exchanger plate 30. The heat exchanger shown in FIG. 3 is of an internal type having inlet 31 and outlet 32, through which a cooling medium, e.g. water, may be passed. Heat exchanger 30, as shown in FIG. 3, is conveniently a hollow, metallic, built-up structure having a header portion 33 opening in one face of said heat exchanger box 30, and a header structure 34 opening in the opposite face. A cooling coil 35 is provided communicating at one end with the header box 33, and exiting at the other end in header box 34. Adapter insulator members 36 and 37 insulate the heat exchanger from the adjacent electrodes 17, and are provided with suitable apertures 38 and 39 respectively to conduct fluid to and from headers 33 and 34, respectively. The presence of a heat exchanger in the electrolytic cell of the present invention is not essential, and where used its structuer is not necessarily of the internal type as shown in FIG. 3. Any suitable heat exchanger means by which heat may be removed from the electrolyte in course of its passage through the cell may be employed, if desired. Multiple heat exchangers may be employed, located between different cell units.

The electrodes 17 are preferably flat rectangular plates, desirably having equal effective area, with cathodes and anodes in alternate positions. The thickness of the plates is not critical and is dependent upon the mechanical strength of the material used. Cathodes 21 and anodes 19, as shown in FIG. 1, may be constructed of any electrically conductive solid material, metallic or non-metallic, which is inert to the electrolyte under the conditions of electrolysis.

The electrodes 17 and insulating members 22 are sandwiched between end plates 10 and 11, and maintained under compression with proper adjustment of the clamping means comprising 12, 13 and 14. The end plates may be of any suitable material with sufficient mechanical strength to avoid distortion. In one embodiment, stainless steel was employed. Insulator members 22 which are preferably compressible and elastic, e.g. rubber, are placed between the various electrodes 17 to insulate the electrodes 17 from one another, maintain uniform spacing, define the reaction chambers and prevent leakage of the material from the cell. Instead of rubber, other elastomeric materials may be used, e.g. polyvinyl chloride, synthetic rubber, etc.

The several individual undivided cell units consisting of an anode surface and a cathode surface maintained in spaced relation by insulating means marginally closing the spaces between said adjacent electrode surfaces are placed in close proximity, and clamped together to form a composite electrolytic cell. The space between the anode and cathode surfaces of the respective cell units is preferably substantially equal. Any number of cell units may be assembled forming a multiple unit electrolytic cell.

In constructing a cell of this type, it is desirable to place the adjacent electrode surfaces in close proximity. We have built and operated a cell of the type shown and described herein with a spacing of ⅛″ and found it to be satisfactory. The electrodes should not be placed so close together as to cause shorting, or so far apart as to result in inadequate utilization of the electrode surfaces.

The number of cell units which may be included in the same apparatus, and the dimension of these cells, depends primarily upon the desired throughput. The flow rate of electrolyte through the cell should be great enough to allow sufficient contact of the reactants with the electrode surfaces and rapid removal of the products formed. Liquid convection is particularly important in organic reactions where molecular diffusion is slow. The ratio of the length of the cell unit to the spacing between the anode and cathode surfaces is an important factor from the standpoint of product yield. Enough surface area should be available for chemical reaction to occur. Ratios of between 50:1 to 50,000:1 have been found to be within practical limits. In general, the current densities occurring within the cell composite of the present invention may vary within relatively wide limits without adversely affecting the course of the reaction. Generally, it may be stated that the current density should fall somewhere in the range of from 10 to 1000 amperes per square foot, and a range of 30 to 500 amperes per square foot is preferred. The optimum current density will vary depending upon the operating conditions which include the material to be treated, the concentrations to be employed, operating temperature, etc. In utilizing the electrolytic cell of the present invention, it may be found desirable to reverse the polarity of the electrodes for a brief period of time as this seems to improve the activity of the electrode surfaces.

The temperature at which cells in accordance herewith are operated is not critical. In general, the temperature should be kept below the boiling point of the materials undergoing electrochemical change at the pressure of operation. Such temperature control may be effected, as indicated above, by the employment of suitable heat exchanger means either internally or externally of the electrode pile. Pressures above, at or below atmospheric pressure may be employed.

When the electrolytic cells of the present invention are utilized in the preparation of halogenated organic hydroxy compounds from an electrolyte containing in aqueous solution an unsaturated aldehyde or ketone, and a hydrogen halide, it is believed that the result of the electrochemical oxidation or reduction is as follows:

The unsaturated aldehyde or ketone, e.g. acrolein, the hydrogen halide, e.g. HCl, and the water interact under the influence of the direct electrical current. A hydroxy radicle and a halogen radicle, or two halogen radicles become attached to the olefinic bond of the starting material to form a halogenated organic hydroxy compound, or a halogenated carbonyl compound in the case of a ketonic starting material. This halohydrination, or halogenation, is believed to be effected at or in the substantial vicinity of the anode. At the same time the aldehyde or ketone group attached to the organic starting material is apparently reduced at or in the substantial vicinity of the cathode. The cathode and anode reactions appear to take place simultaneously, but whether the reactions are simultaneous or sequential is not important to this invention. Intermediate reactions may occur including the formation of a hypohalous acid preceding the formation of the end product. At this time it is not known definitely just what reactions take place in the cell.

The term current efficiency or electric current efficiency as employed herein denotes the ratio of the electrictiy employed equivalent to the number of moles of substance transformed to the quantity of electricity actually consumed. In the halohydrination of unsaturated aldehydes and ketones, a theoretical minimum of 2 Faradays of electricity is required to form one mole of halohydrin.

As an example of an electrolytic cell of the present invention, a cell was made up of six rectangular electrodes measuring 2¾″ by 8″ clamped between stainless steel end plates insulated from the pile by gaskets. Gum rubber insulators ⅛″ thick were employed to separate the electrodes. The effective electrode area of each side of the plate was 14 square inches, and since the two outermost sides of the electrodes terminating the pile of cell units are not available for electrolytic oxidation or reduction, the apparatus had a total effective electrode area of 140 square inches. A feed reservoir and pump were provided to introduce the feed to the apparatus in a continuous manner. The reaction products were removed by a pump at a continous rate corresponding to the rate of introduction of the feed.

In an apparatus employing three cadmium plates as the cathodes, and three graphite plates as the anodes, a 0.5 normal solution of hydrogen bromide containing 2% cadmium bromide to which acrolein was added gradually was introduced at a rate of 375 ml./min. An electrical current density of 100 amperes per square foot was passed at about 2.7 volts across the individual cell units of the apparatus. The reaction was continued for a period of about 1.5 hours during which time a total of about 0.24 mole of acrolein and 0.42 mole of hydrobromic acid were introduced. A total of 1.18 Faradays of electricity were passed through the solution. The temperature was maintained at about 40° C. during the reaction. Analysis of the resulting solution showed that it contained predominantly glycerol, mono and dibromohydrins. The conversion of acrolein to useful products was 93.4% and the yield of the mixture of mono and dibromohydrins was 80%. An additional yield of 20% was obtained as propionaldehyde and n-propanol. Current efficiency for conversion of acrolein to bromohydrins was 30.4%.

There has thus been provided an electrolytic cell composed of a laminated plurality of undivided cell units serially connected to receive a continuous flow of electrolyte therethrough. These cells have no diaphragm, and are thus simpler and less costly to construct and maintain than those heretofore available.

By a system of openings coacting with the adjacent marginal walls of the insulators, as inlet and exit from each cell unit disposed at opposite ends of each cell unit it is possible to provide a continuous flow in sheet-like manner of a relatively thin layer of electrolyte maintained under electrolytic influences for producing useful organic compounds directly from readily available starting materials.

Other modes of applying the principle of this invention may be employed instead of those specifically set forth above, changes being made as regards the details herein disclosed, provided the elements set forth in the following claim or the equivalent of such be employed.

We claim:

In an electrochemical reaction apparatus having a pair of closure plates disposed in spaced parallel relation with a plurality of electrode plates of regular geometric configuration successively separated from each other and from the closure plates by insulating plates disposed in juxtaposed parallel relation between the closure plates to form a plurality of parallel reaction chambers, means for connecting alternate electrode plates to opposite poles of a source of direct current, each of said closure plates having an aperture at one end forming an inlet and an outlet respectively for liquid electrolyte, the electrodes adjacent the closure plates each having a mating aperture at one end, respectively, communicating with the corresponding aperture in the adjacent closure plate, each of said insulating plates having an opening substantially co-extensive with and conforming to the regular geometric configuration of said electrode plates, the remainder of each of said insulating plates providing a marginal boundary forming a hollow reaction chamber between successive electrode plates, the terminal insulating plates adjacent the inlet and outlet electrode plates each having a marginal boundary converging at one end only towards the inlet and outlet respectively at the corresponding ends thereof, and said terminal insulating plates each having a rectangular marginal boundary at the opposite end, the intermediate electrode plates each having an elongated slit-like aperture at one end only thereof disposed transverse to the flow of electrolyte through the reaction chambers and substantially coextensive with the corresponding transverse dimension of said chambers, said elongated slit-like apertures being disposed at opposite ends of successive electrode plates and relative to the inlet and outlet apertures to provide a sinuous sheet-like flow path for the electrolyte through the plural reaction chambers, the marginal boundary configuration of each insulating plate coacting with the configuration of the inlet and outlet apertures in adjacent electrode plates to expose the entire electrode surfaces of each reaction chamber to the electrolyte flowing therethrough and heat exchanger means intermediate a pair of said plurality of electrode plates including a chamber of generally rectilinear configuration having an electrolyte conducting coil disposed therein, a pair of spaced electrolyte collecting headers each communicating with opposite planar faces of said chamber and with opposite ends of said electrolyte coil, means for introducing heat exchange medium into said chamber and flowing said medium therethrough externally to said electrolyte coil including means for exhausting heat exchange medium from said chamber, and insulating means disposed on opposite planar faces of said heat exchanger means for isolating said heat exchanger means from said pair of electrodes, respectively, each said insulating means including a corresponding aperture therethrough for admission of electrolyte to and from said headers, respectively.

References Cited in the file of this patent

UNITED STATES PATENTS

| | | |
|---|---|---|
| 974,576 | Landis et al. | Nov. 1, 1910 |
| 1,065,361 | Hartman | June 24, 1913 |
| 1,541,947 | Hartman et al. | June 16, 1925 |
| 1,674,364 | Hartman | June 19, 1928 |
| 1,738,372 | Edgeworth-Johnstone | Dec. 3, 1929 |
| 2,069,206 | Axtell | Feb. 2, 1937 |